(12) United States Patent
Butterworth

(10) Patent No.: US 7,016,520 B2
(45) Date of Patent: Mar. 21, 2006

(54) ELECTRONIC DEVICE WITH DIGITAL CAMERA FOR GENERAL-PURPOSE PHOTOGRAPHY AND FINGERPRINT SENSING

(76) Inventor: Mark Melvin Butterworth, 1966 Stanley Ave., Santa Clara, CA (US) 95050

( * ) Notice: Subject to any disclaimer, the term of this patent is extended or adjusted under 35 U.S.C. 154(b) by 649 days.

(21) Appl. No.: 10/094,567

(22) Filed: Mar. 7, 2002

(65) Prior Publication Data

US 2003/0169905 A1    Sep. 11, 2003

(51) Int. Cl.
*G06K 9/00* (2006.01)

(52) U.S. Cl. .................. 382/124; 396/15; 340/5.83; 902/3

(58) Field of Classification Search ............... 382/115, 382/124–127; 396/15; 356/71
See application file for complete search history.

(56) References Cited

U.S. PATENT DOCUMENTS

| | | | |
|---|---|---|---|
| 4,428,670 A * | 1/1984 | Ruell et al. ............... | 356/71 |
| 5,680,205 A * | 10/1997 | Borza ....................... | 356/71 |
| 5,920,640 A * | 7/1999 | Salatino et al. ............ | 382/124 |
| 6,288,779 B1 * | 9/2001 | Smith ........................ | 356/71 |
| 2002/0003892 A1 * | 1/2002 | Iwanaga .................... | 382/124 |
| 2003/0135764 A1 * | 7/2003 | Lu ............................ | 713/202 |
| 2004/0169938 A1 * | 9/2004 | Nakamura et al. ......... | 359/754 |

FOREIGN PATENT DOCUMENTS

JP      2002-27047    *   1/2002

* cited by examiner

*Primary Examiner*—Samir Ahmed
*Assistant Examiner*—Charles Kim

(57) ABSTRACT

An apparatus is configured for use with a digital camera to capture images of a fingerprint with the camera. The digital camera includes a primary lens for general photography purposes. The apparatus includes an accessory lens assembly including a first surface for supporting a finger to be imaged. The accessory lens assembly is configured to direct light reflected from the finger to the primary lens of the digital camera. A connection mechanism connects the accessory lens assembly to the digital camera. The accessory lens assembly is movable via the connection mechanism to cover the primary lens for fingerprint imaging, and is movable via the connection mechanism away from the primary lens to allow the digital camera to be used for general photography purposes.

13 Claims, 9 Drawing Sheets

ELECTRONIC DEVICE WITH DIGITAL CAMERA FOR GENERAL-PURPOSE PHOTOGRAPHY AND FINGERPRINT SENSING

THE FIELD OF THE INVENTION

This invention relates generally to digital cameras. This invention relates more particularly to an electronic device with a digital camera configured to be used as both a general-purpose camera and a fingerprint sensor.

BACKGROUND OF THE INVENTION

Many electronic devices, such as cellular telephones and personal digital assistants (PDAs), have the need for a digital camera to be included in the design. Such combined devices have been manufactured. The digital cameras for such combined devices are designed for general photography use. In addition to the primary lens in a digital camera, some models allow the use of accessory lenses. The use of accessory lenses is a common technique for changing the way the primary lens of the camera works. Such commonly used accessory lenses include wide angle, telephoto, and macro lens attachments.

Fingerprint recognition systems have also been developed. Incorporating a fingerprint recognition system into an electronic device provides security and authentication of the user. Existing fingerprint recognition systems use their own dedicated optics and image sensor for capturing images of fingerprints. Thus, for example, if a conventional fingerprint recognition system were incorporated into a digital camera, or a combined electronic device that included a digital camera, two independent sets of optics and image sensors would be needed.

It would be desirable to provide an accessory lens assembly that includes a lens/illumination system and a suitable surface for imaging a finger, and thereby be able to make use of the existing optics and image sensor of an electronic device that includes a digital camera to provide fingerprint recognition functionality.

SUMMARY OF THE INVENTION

One form of the present invention provides an apparatus configured for use with a digital camera to capture images of a fingerprint with the camera. The digital camera includes a primary lens for general photography purposes. The apparatus includes an accessory lens assembly including a first surface for supporting a finger to be imaged. The accessory lens assembly is configured to direct light reflected from the finger to the primary lens of the digital camera. A connection mechanism connects the accessory lens assembly to the digital camera. The accessory lens assembly is movable via the connection mechanism to cover the primary lens for fingerprint imaging, and is movable via the connection mechanism away from the primary lens to allow the digital camera to be used for general photography purposes.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
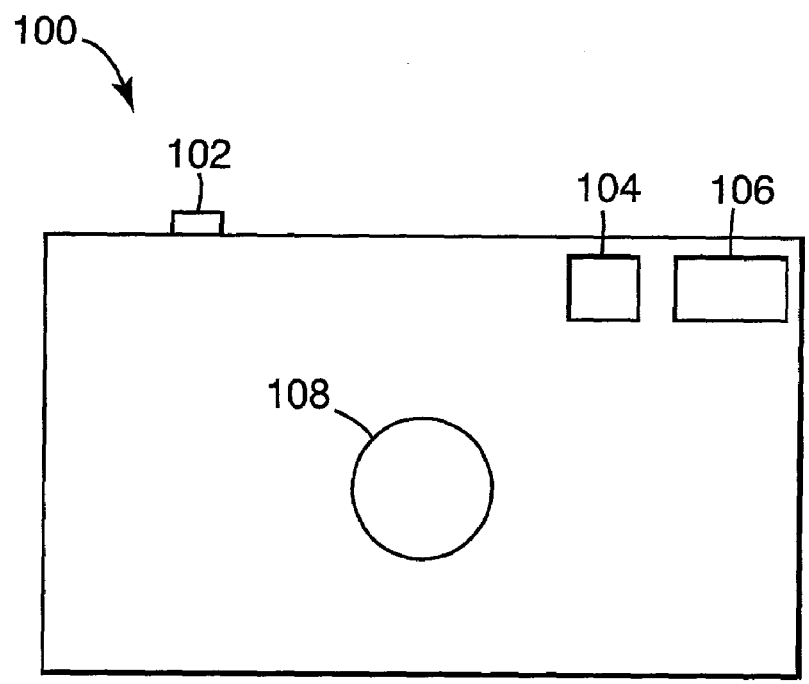
FIG. 1A is a diagram illustrating a simplified front view of a prior art digital camera.
Figure 1B:
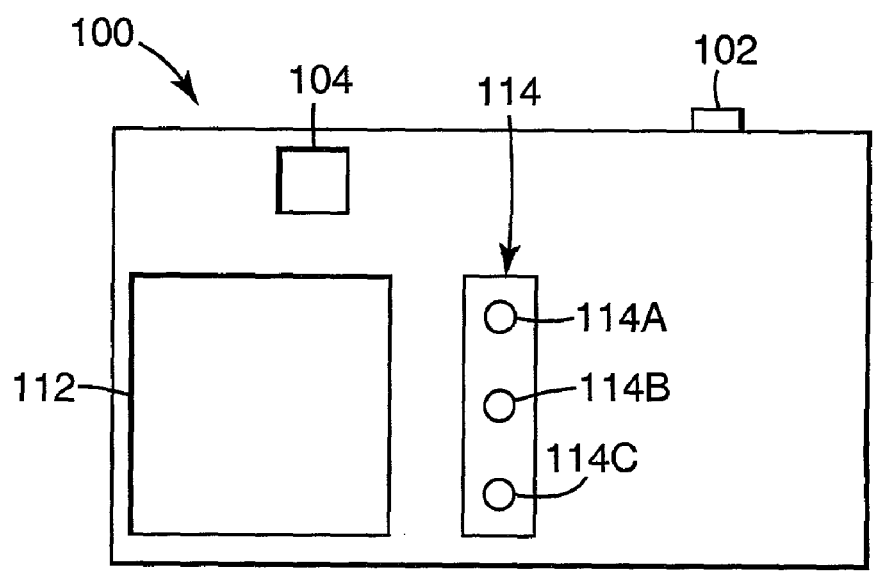
FIG. 1B is a diagram illustrating a simplified rear view of the digital camera shown in FIG. 1A.

FIG. 1A is a diagram illustrating a simplified front view of a prior art digital camera 100. FIG. 1B is a diagram illustrating a simplified rear view of the digital camera 100 shown in FIG. 1A. As shown in FIGS. 1A and 1B, camera 100 includes shutter button 102, optical viewfinder 104, flash 106, primary lens 108, liquid crystal display (LCD) 112, and user input device 114. User input device 114 includes buttons 114A–114C. User input device 114 allows a user to enter data and select various camera options.

In operation, a user looks through optical viewfinder 104 or at LCD 112 and positions camera 100 to capture a desired image. When camera 100 is in position, the user presses shutter button 102 to capture the desired image. An optical image is focused by primary lens 108 onto an image sensor, which generates pixel data that is representative of the optical image. Captured images are displayed on display 112. Flash 106 is used to illuminate an area to capture images in low-light conditions.

Figure 2:
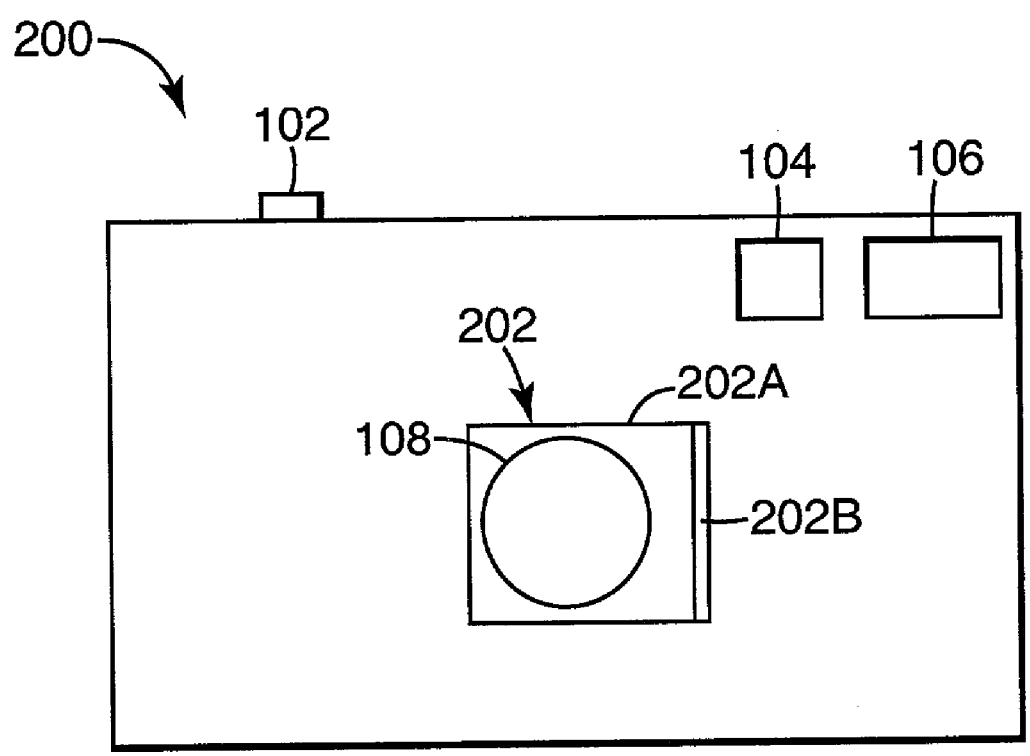
FIG. 2 is a diagram illustrating a simplified front view of a digital camera configured to be used as both a general-purpose camera and a fingerprint sensor according to one embodiment of the present invention.

FIG. 2 is a diagram illustrating a simplified front view of a digital camera 200 configured to be used as both a general-purpose camera and a fingerprint sensor according to one embodiment of the present invention. In one embodiment, camera 200 includes the same features as camera 100, and also includes fingerprint attachment 202. Fingerprint attachment 202 includes lens assembly 202A and hinge 202B. Fingerprint attachment 202 is mounted to the front face of camera 200 via hinge 202B. Lens assembly 202A is configured to rotate about hinge 202B, so that lens assembly 202A may be positioned over primary lens 108 (as shown in FIG. 2) for capturing fingerprint images, or rotated away from primary lens 108 (as shown in FIG. 3A) for general-purpose photography.

Figure 3A:
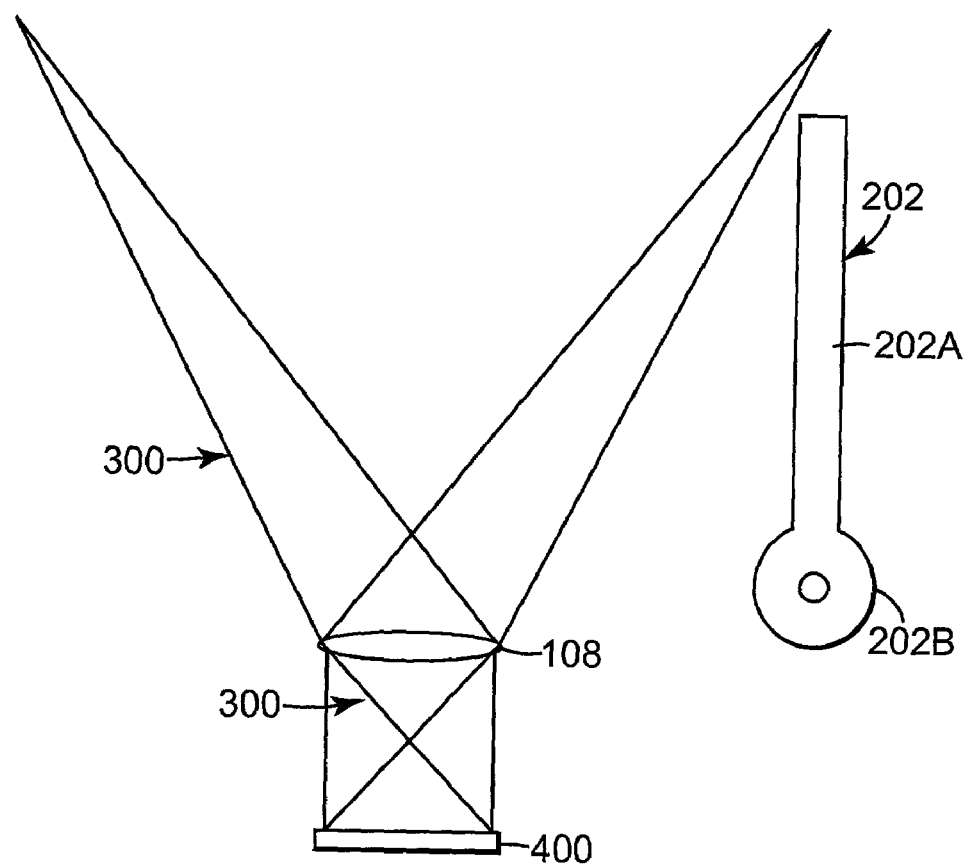
FIG. 3A is a diagram illustrating an attachment for a digital camera for facilitating fingerprint sensing according to one embodiment of the present invention.

FIG. 3A is a diagram illustrating fingerprint attachment 202 in an up position, so it is not covering primary lens 108 of digital camera 200. When fingerprint attachment 202 is in an up position, digital camera 200 may be used for general-purpose photography, with light 300 being directed by primary lens 108 onto image sensor 400.

Figure 3B:
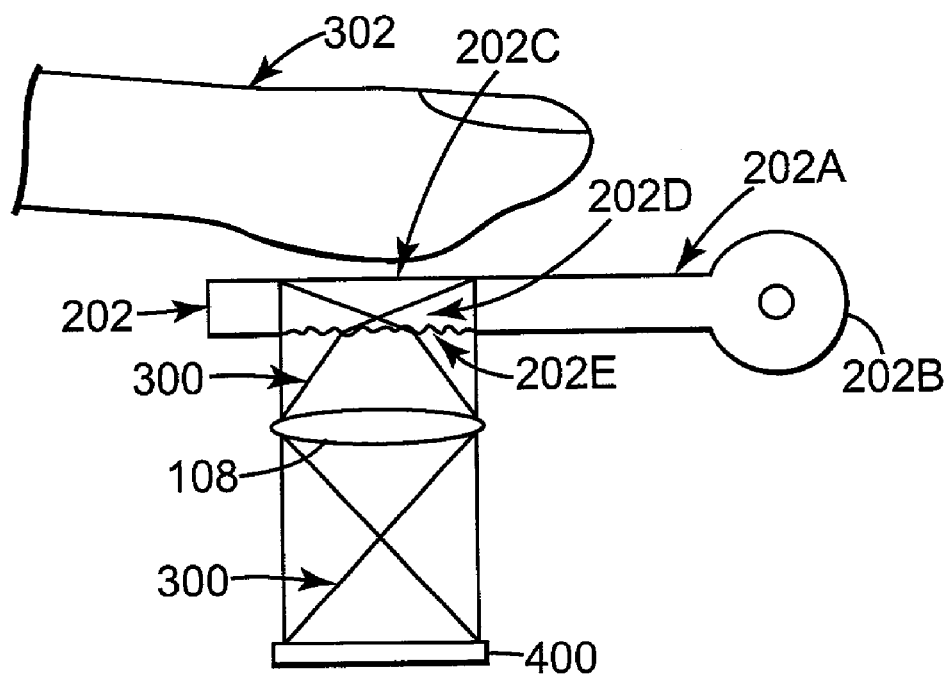
FIG. 3B is a diagram illustrating the attachment shown in FIG. 3A in a down position.

FIG. 3B is a diagram illustrating fingerprint attachment 202 in a down position, so it is covering primary lens 108 of digital camera 200. When fingerprint attachment 202 is in a down position, digital camera 200 may be used to scan fingerprints. As shown in FIG. 3B, finger 302 is placed on surface 202C of attachment 202. In one embodiment, surface 202C is a flat, transparent, soft surface, such as glass with a thin layer of silicon rubber deposited thereon, or other transparent, soft, compliant material. Using such a soft surface facilitates imaging of the grooves in the finger, particularly for dry skin. Light 300 reflected off of finger 302 goes through a hollow chamber 202D of attachment 202, and is directed by lens 202E onto primary lens 108, which directs the light 300 onto image sensor 400. Image sensor 400 captures an image of the fingerprint. In an alternative embodiment, little or no spacing is provide between surface 202C and lens 202E. In another alternative embodiment, rather than using a separate surface 202C for placement of a finger, and having a hollow chamber 202D between the surface 202C and the lens 202E, a finger is placed directly on lens 202E. So in this alternative embodiment, lens 202E provides both a close focusing capability and a surface for placement of a finger.

In one embodiment, lens 202E is a custom lens, such as a Fresnel lens or a diffractive lens. In an alternative embodiment, lens 202E is a conventional macro lens. Fresnel, diffractive, and macro lenses all perform the same function, which is to provide the close focusing capability that is needed for imaging micro-features like the whorls of skin in a finger. Fresnel lenses include several prism pieces, and rely on the optical property of refraction. Diffractive lenses include small grooved features to create constructive and destructive interference in the wave front of the light. Macro lenses are conventional lenses with two convex surfaces. Fresnel and diffractive lenses can be made very small, which is desirable for small electronic devices, such as cellular telephones, PDA'S, and other similar devices.

Figure 3C:
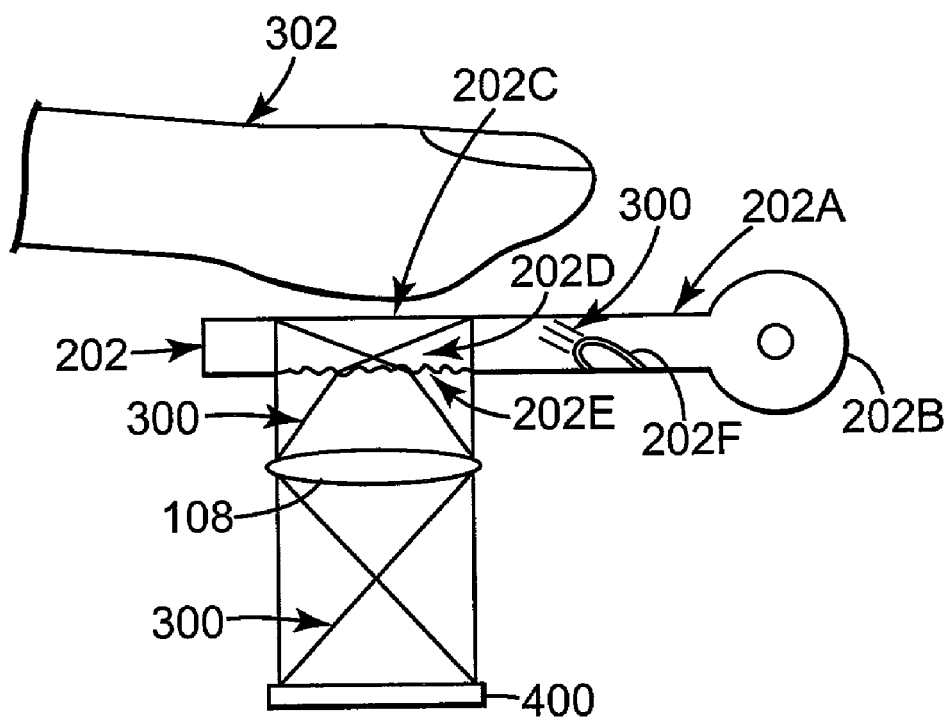
FIG. 3C is a diagram illustrating the attachment shown in FIG. 3B with the addition of a light source for illuminating a finger to be imaged.

FIG. 3C is a diagram illustrating the attachment 202 shown in FIG. 3B, with the addition of a light source 202F for illuminating a finger placed on surface 202C. In one embodiment, light source 202F is a light emitting diode (LED). In one form of the invention, light source 202F is configured to provide light 300 at a grazing angle, such as an angle between about 5 to 10 degrees relative to surface 202C, although other angles may be used. In an alternative embodiment, fingerprint attachment 202 uses total internal reflection to provide more contrast and an easier to photograph image of the fingerprint. With total internal reflection, light rays directed toward portions of surface 202C that are covered by air are reflected, causing these portions to appear bright in the reflected image. And light rays directed toward other portions of surface 202C are transmitted through surface 202C, causing these portions to appear dark in the reflected image.

Figure 4:
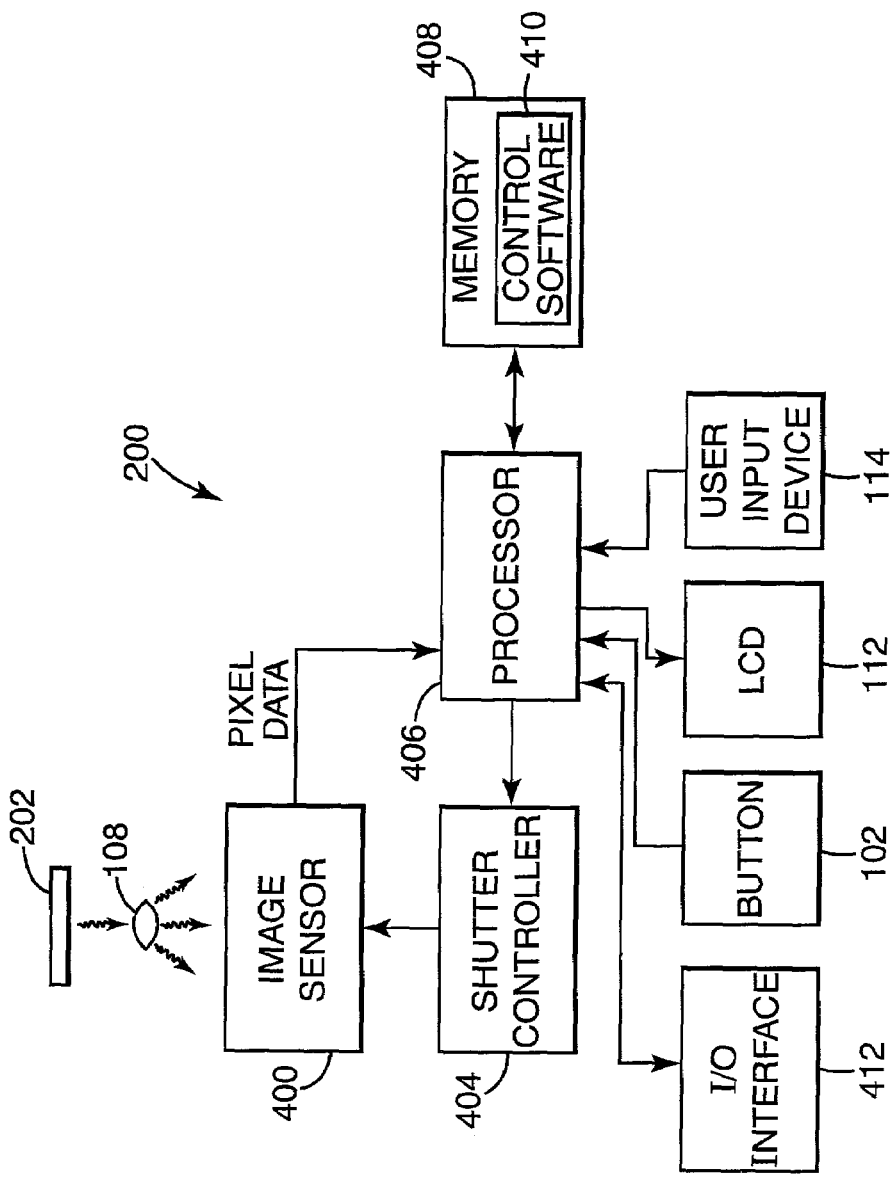
FIG. 4 is a block diagram illustrating major components of the digital camera shown in FIG. 2.

FIG. 4 is a block diagram illustrating major components of digital camera 200. Camera 200 includes fingerprint attachment 202, primary lens 108, image sensor 400, shutter controller 404, processor 406, memory 408, input/output (I/O) interface 412, shutter button 102, LCD 112, and user input device 114. In one embodiment, memory 408 includes some type of random access memory (RAM) and non-volatile memory, but can include any known type of memory storage. In operation, when a user presses shutter button 102, processor 406 and shutter controller 404 cause image sensor 400 to capture an image. Image sensor 400 then outputs pixel data representative of the image to processor 406. The pixel data is stored in memory 408, and captured images may be displayed on LCD 112.

Control software 410 for controlling processor 406 is stored in memory 408. In one form of the invention, control software 410 includes software for analyzing captured fingerprint images to verify the user of digital camera 200. After camera 200 has captured a fingerprint image, control software 410 performs a conventional matching algorithm to determine whether the captured fingerprint image matches a stored fingerprint image. Algorithms for performing fingerprint comparison and matching functions are known to those of ordinary skill in the art. In one embodiment, camera 200 is configured to limit access to various features of camera 200, such as capturing images and viewing previously captured images, to only authorized users who have previously had their fingerprint images stored in memory 408 and pass a fingerprint verification. In one form of the invention, any time camera 200 is powered on, the user's identity must be verified by having the user's fingerprint scanned with camera 200 before camera 200 can be operated.

I/O interface 412 is configured to be coupled to a computer or other appropriate electronic device (e.g., a personal digital assistant), for transferring information between the electronic device and camera 200, including downloading captured images from camera 200 to the electronic device.

Figure 5A:
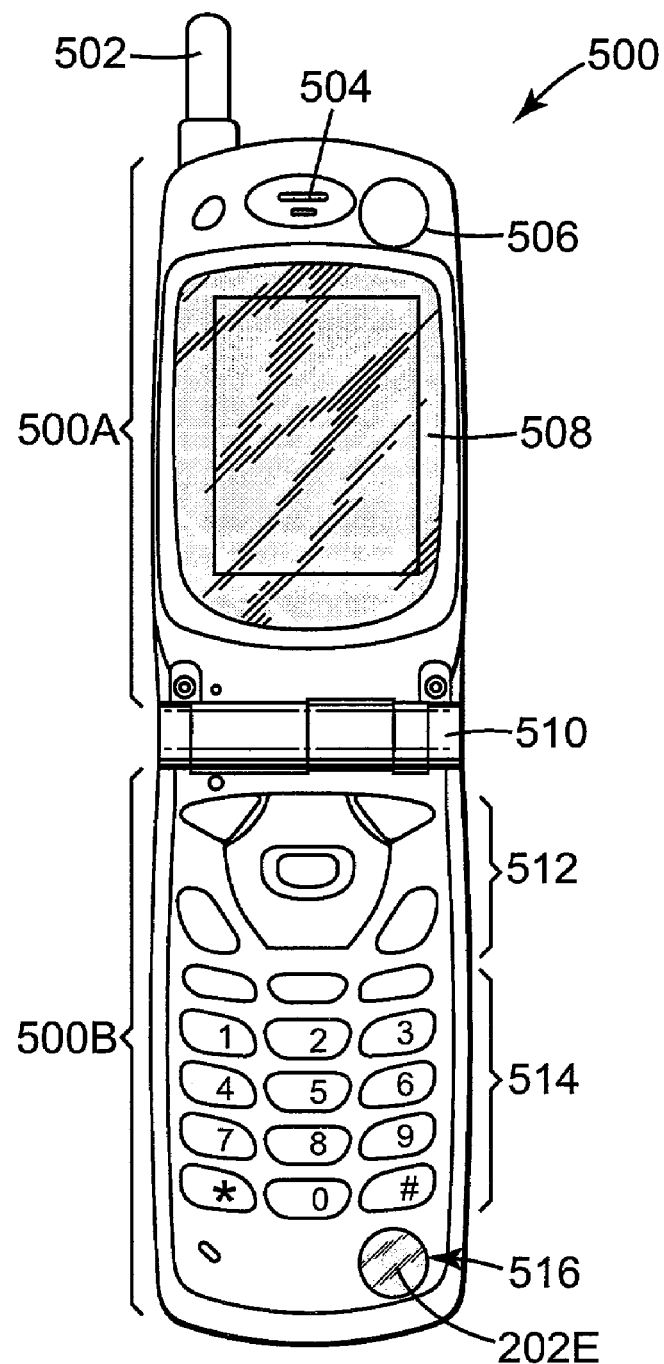
FIG. 5A is a diagram illustrating a front side of a combined cellular telephone and digital camera device configured to scan fingerprints according to one embodiment of the present invention.
Figure 5B:
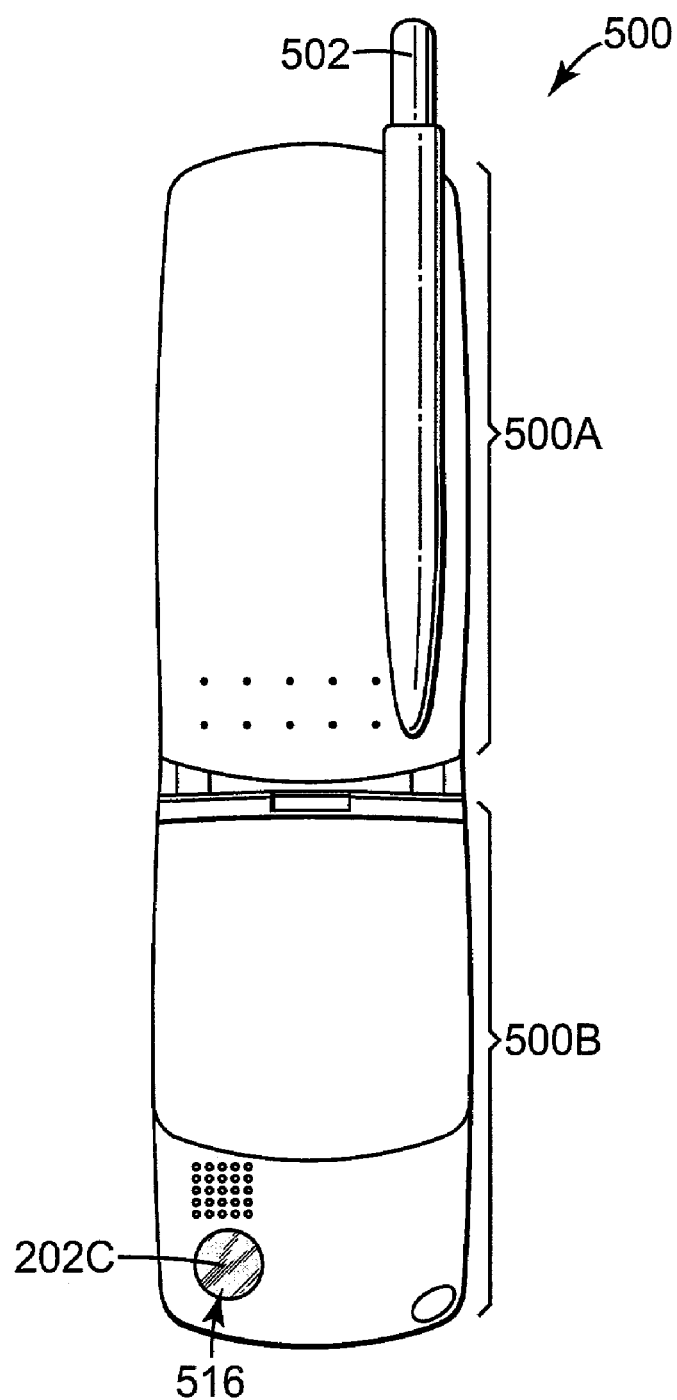
FIG. 5B is a diagram illustrating a back side of the combined cellular telephone and digital camera device shown in FIG. 5A.

FIG. 5A is a diagram illustrating a front side of a combined cellular telephone and digital camera device 500 configured to scan fingerprints according to one embodiment of the present invention. FIG. 5B is a diagram illustrating a back side of the combined cellular telephone and digital camera device 500 shown in FIG. 5A. Device 500 includes upper portion 500A and lower portion 500B, which may be rotated about hinge 510 to go from an open position (as shown in FIG. 5A) to a closed position, as is common with many current cellular telephone models. Device 500 includes antenna 502, speaker 504, primary digital camera lens 506, LCD 508, navigation and control buttons 512, numeric keypad 514, and fingerprint lens assembly 516. As will be understood by one of ordinary skill in the art, in addition to including primary lens 506, the digital camera of device 500 also includes conventional internal camera components (not shown in FIG. 5A), such as those shown in FIG. 4 (e.g., image sensor 400, shutter controller 404, processor 406, and memory 408).

In addition to displaying information regarding cellular telephone operation, LCD 508 is also used as a viewfinder for the digital camera of device 500, and displays captured images. Although no optical viewfinder is shown for device 500, it will be understood by a person of ordinary skill in the art that device 500 could incorporate an optical viewfinder, as well as any other conventional features of currently available digital cameras.

Navigation and control buttons 512 and numeric keypad 514 are used to enter information, navigate through menus displayed on LCD 508 and select menu items, and control operation of device 500. Any one of buttons 512 or 514 may be designated as a shutter button 102 for capturing images with the digital camera of device 500, or a dedicated shutter button 102 can be provided.

In one embodiment, fingerprint assembly 516 is configured similarly to fingerprint attachment 202 (shown in FIGS. 2 and 3A–3C), and includes a transparent surface 202C (shown in FIG. 5B) on the back side of device 500 for placing a finger on, a lens 202E on the front side of device 500 for directing light reflected from the finger to the primary lens 506, and a hollow chamber 202D between the surface 202C and the lens 202E. In one embodiment, fingerprint assembly 516 also includes a light source 202F for illuminating the finger.

Device 500 is configured to act as a fingerprint sensor when upper portion 500A and lower portion 500B are folded together via hinge 510 into a closed position. When device 500 is in the closed position, lens 202E of fingerprint assembly 516 is aligned with primary lens 506. A finger is placed on surface 202C on the back side of device 500. Light reflected off of the finger goes through a hollow chamber 202D of assembly 516, and is directed by lens 202E onto lens 506, which directs the light onto an image sensor 400 within device 500. Image sensor 400 captures an image of the fingerprint.

Figure 6:
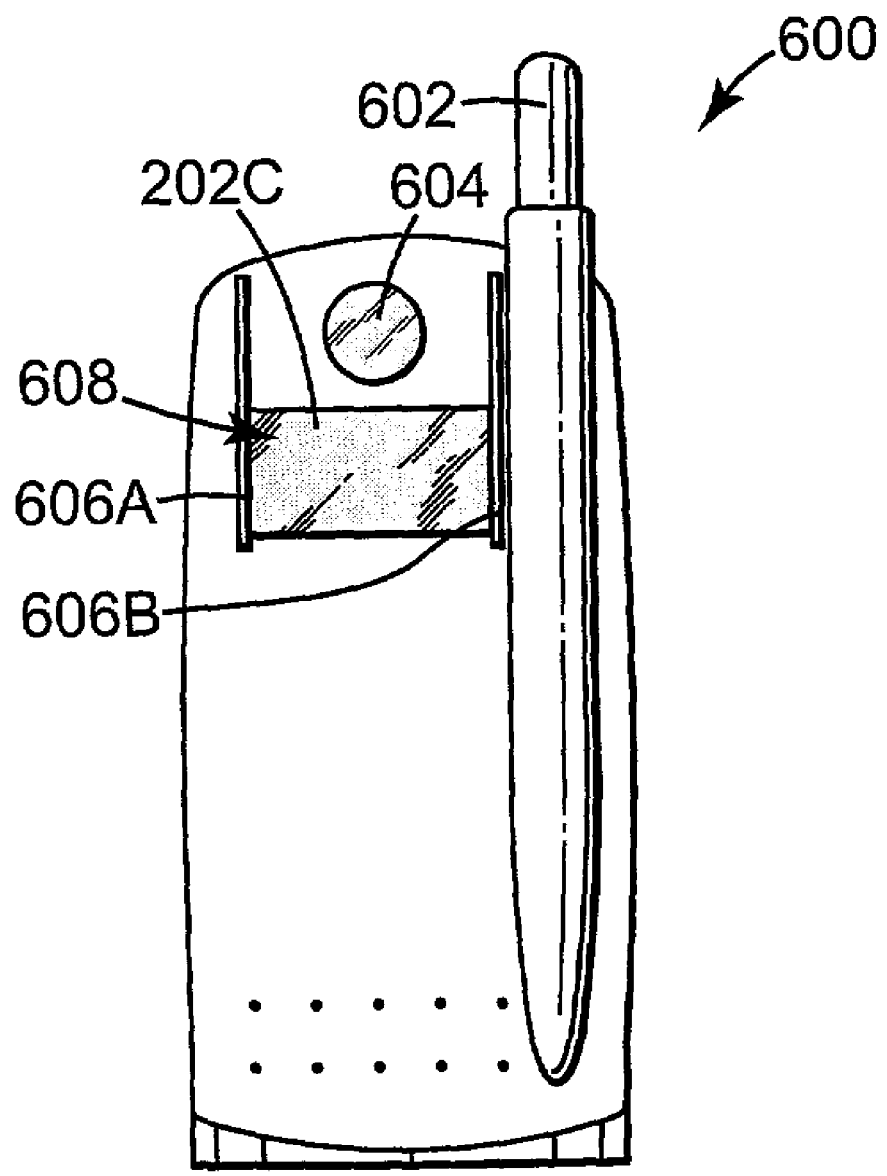
FIG. 6 is a diagram illustrating a front side of a combined cellular telephone and digital camera device configured to scan fingerprints according to an alternative embodiment of the present invention.

FIG. 6 is a diagram of a front side of a combined cellular telephone and digital camera device 600 configured to scan fingerprints according to an alternative embodiment of the present invention. As shown in FIG. 6, device 600 is in a closed position. Device 600 includes antenna 602, primary digital camera lens 604, tracks 606A and 606B (collectively referred to as tracks 606), and fingerprint assembly 608. Fingerprint assembly 608 is configured to slide along tracks 606.

In one embodiment, fingerprint assembly 608 is configured similarly to fingerprint attachment 202 (shown in FIGS. 2 and 3A–3C), and includes a transparent surface 202C on the top side of assembly 608 for placing a finger on, a lens 202E (not shown in FIG. 6) on the bottom side of assembly 608 for directing light reflected from the finger to the primary lens 604, and a hollow chamber 202D between the surface 202C and the lens 202E. In one embodiment, fingerprint assembly 608 also includes a light source 202F for illuminating the finger.

Device 600 is configured to act as a fingerprint sensor when fingerprint assembly 608 is slid upward along tracks 606 to cover lens 604. Device 600 can act as a fingerprint sensor whether the device 600 is in an open position (e.g., such as shown in FIGS. 5A and 5B) or in the closed position as shown in FIG. 6. After sliding fingerprint assembly 608 into place over lens 604, a finger is placed on surface 202C of assembly 608. Light reflected off of the finger goes through a hollow chamber 202D of assembly 608, and is directed by lens 202E onto lens 604, which directs the light onto an image sensor 400 within device 600. Image sensor 400 captures an image of the fingerprint.

In one embodiment, devices 500 and 600 each include a processor 406 and control software 410 stored in a memory 408 (shown in FIG. 4) to control operation of the devices and to capture and process fingerprint images to verify the user of the device. In one embodiment, devices 500 and 600 are configured to limit access to various features of the devices, such as capturing images and viewing previously captured images, to only authorized users who have previously had their fingerprint images stored in memory 408 and pass a fingerprint verification. In one form of the invention, any time devices 500 and 600 are powered on, the user's identity must be verified by having the user's fingerprint scanned with digital camera before the devices can be operated.

Although embodiments of the present invention have been discussed in the context of a combined cellular telephone/digital camera device, it will be understood by a person of ordinary skill in the art that the techniques disclosed herein are applicable to any device that incorporates a digital camera, including but not limited to, a PDA and a laptop computer. For example, many PDA's include a cover that flips up and down to cover the PDA display, similar to the manner in which some cellular phones can be flipped open and closed. For such PDA's, a fingerprint assembly (e.g., such as fingerprint assembly 516 shown in FIG. 5A) can be incorporated into the cover, so that a digital camera of the PDA can be used for general photography purposes when the cover is open, and be used for imaging fingerprints when the cover is closed. Similarly, most laptop computers are configured with a hinge connection between the monitor and the keyboard. If the laptop computer includes a digital camera, the camera could be used for general photography purposes when the laptop computer is in the open position, and could be used for fingerprint scanning when the laptop computer is in the closed position.

A couple of different techniques have been described herein for mechanically attaching a fingerprint assembly to an electronic device. For example, FIG. 2 illustrates a hinge type attachment, and FIG. 6 illustrates a sliding track type attachment. It will be understood by a person of ordinary skill in the art that other types of mechanical, or electromechanical attachment mechanisms may be used to implement embodiments of the present invention.

It will be understood by a person of ordinary skill in the art that functions performed by devices 200, 500, and 600, including functions performed by control software 410, may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus configured for use with a digital camera to capture images of a fingerprint with the camera, the digital camera including a primary lens for general photography purposes, the apparatus comprising:

an accessory lens assembly including a first surface for supporting a finger to be imaged, the accessory lens assembly configured to direct light reflected from the finger to the primary lens of the digital camera; and a hinge type connection mechanism for connecting the accessory lens assembly to the digital camera, wherein the accessory lens assembly is movable via the connection mechanism to cover the primary lens for fingerprint imaging, and is movable via the connection mechanism away from the primary lens to allow the digital camera to be used for general photography purposes.

2. The apparatus of claim 1, wherein the accessory lens assembly includes a Fresnel lens.

3. The apparatus of claim 1, wherein the accessory lens assembly includes a diffractive lens.

4. The apparatus of claim 1, wherein the accessory lens assembly includes a macro lens.

5. The apparatus of claim 1, wherein the accessory lens assembly includes a light source for illuminating a finger placed on the first surface.

6. The apparatus of claim 5, wherein the light source is an LED.

7. The apparatus of claim 1, wherein the first surface includes a transparent, soft, compliant material.

8. The apparatus of claim 1, wherein the connection mechanism is a sliding mechanism for sliding the accessory lens assembly on top of and away from the primary lens.

9. A method of authenticating the user of an electronic device that includes a general-purpose digital camera, the method comprising:
   placing a fingerprint lens assembly over a primary lens of the digital camera, the fingerprint lens assembly including a first surface for supporting a finger to be imaged and a hinge type connection mechanism for connecting the fingerprint lens assembly to the digital camera, the fingerprint lens assembly configured to work in conjunction with the primary lens of the digital camera to provide a focused image of the finger;
   illuminating a finger placed on the first surface with a light source in the fingerprint lens assembly;
   capturing an image of the finger with the digital camera;
   comparing the captured image to stored image data to determine whether the captured image matches a stored image;
   controlling operation of the electronic device based on the comparison.

10. The method of claim 9, wherein the electronic device is one of a cellular telephone, a personal digital assistant device, and a laptop computer.

11. An electronic device including a general-purpose digital camera, the electronic device comprising:
   a display screen for displaying images captured with the digital camera;
   an input device for inputting information into the electronic device;
   a fingerprint lens assembly configured to be positioned over a primary lens of the digital camera, the fingerprint lens assembly including a first surface for supporting a finger to be imaged, the fingerprint lens assembly configured to work in conjunction with the primary lens of the digital camera to provide a focused image of the finger;
   a processor for comparing a captured image of a finger to stored image data to determine whether the captured image of the finger matches a stored image; and
   wherein the electronic device is configured to prevent access to features of the device if the captured image of the finger does not match a stored image; wherein the electronic device includes a protective cover movably attached to the electronic device to cover and uncover the electronic device, and wherein the fingerprint lens assembly is incorporated into the protective cover; and
   wherein the fingerprint lens assembly is positioned over the primary lens of the digital camera only when the electronic device is covered by the protective cover.

12. The electronic device of claim 1 and further comprising:
   a light source for illuminating a finger placed on the first surface.

13. The electronic device of claim 1 wherein the electronic device is one of a cellular telephone, a personal digital assistant device, and a laptop computer.

* * * * *